United States Patent
Fisher

(10) Patent No.: US 6,360,535 B1
(45) Date of Patent: Mar. 26, 2002

(54) SYSTEM AND METHOD FOR RECOVERING ENERGY FROM AN AIR COMPRESSOR

(75) Inventor: Alvin Joel Fisher, Murray, KY (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 0 days.

(21) Appl. No.: 09/685,134

(22) Filed: Oct. 11, 2000

(51) Int. Cl.$^7$ .............................................. F16D 31/02
(52) U.S. Cl. .................................................. 60/409
(58) Field of Search ........................ 60/409, 410, 412, 60/413, 415, 418

(56) References Cited

U.S. PATENT DOCUMENTS

| | | | |
|---|---|---|---|
| 2,392,783 A | 1/1946 | Stevens | 62/136 |
| 2,594,686 A | 4/1952 | Sammons | 60/97 |
| 2,838,298 A | 6/1958 | Henderson | 264/1 |
| 3,677,008 A | 7/1972 | Koutz | 60/59 |
| 3,924,408 A | 12/1975 | Beiswenger et al. | 60/290 |
| 3,925,984 A | 12/1975 | Holleyman | 60/370 |
| 3,925,989 A | 12/1975 | Pustelnik | 60/602 |
| 3,996,748 A | 12/1976 | Melchior | 60/614 |
| 4,043,126 A | 8/1977 | Santos | 60/407 |
| 4,124,332 A | 11/1978 | Nishijyo | 417/26 |
| 4,124,978 A | 11/1978 | Wagner | 60/140 |
| 4,162,614 A | 7/1979 | Holleyman | 60/370 |
| 4,208,592 A | 6/1980 | Leibow et al. | 290/52 |
| 4,215,550 A | 8/1980 | Dinger et al. | 60/606 |
| 4,243,892 A | 1/1981 | Anderson et al. | 290/1 |
| 4,342,201 A | 8/1982 | Ishii | 62/238.4 |
| 4,383,589 A | 5/1983 | Fox | 180/165 |
| 4,445,488 A | 5/1984 | Tanaka et al. | 123/569 |
| 4,481,768 A | 11/1984 | Goshorn et al. | 60/327 |
| 4,586,870 A | 5/1986 | Hohlweg et al. | 415/1 |
| 5,600,953 A | 2/1997 | Oshita et al. | 60/453 |
| 5,605,043 A | 2/1997 | Dimmock | 60/407 |
| 5,632,146 A | 5/1997 | Foss et al. | 60/410 |
| 5,689,141 A | 11/1997 | Kikkawa et al. | 290/52 |
| 5,722,229 A | 3/1998 | Provost | 60/39.07 |
| 5,724,813 A | 3/1998 | Fenelon | 60/606 |
| 5,775,101 A | 7/1998 | Dunlevy | 60/396 |

Primary Examiner—F. Daniel Lopez
Assistant Examiner—Michael Leslie
(74) Attorney, Agent, or Firm—Michael Best & Friedrich LLP

(57) ABSTRACT

A system and method for recovering energy from compressed air. The system and method a microprocessor based control module to monitor compressor discharge pressure and determine the need to bypass gas. Excess compressed air is bypassed to an energy recovery system that converts the potential energy of the compressed air into electrical or mechanical energy. Generated electrical power may be returned to the main power grid or used to power auxiliary equipment, such as the compressor's oil pump.

19 Claims, 4 Drawing Sheets

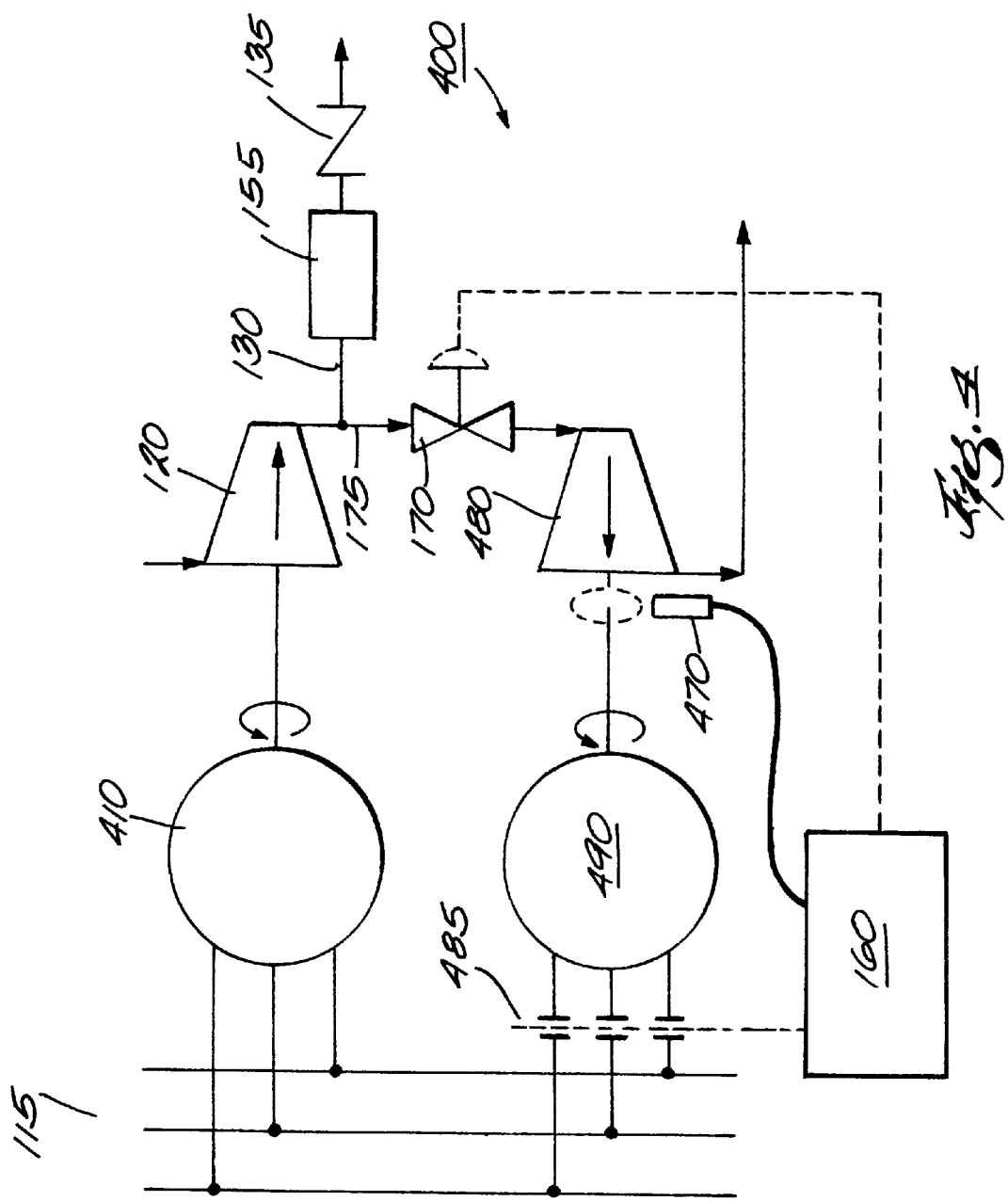

SYSTEM AND METHOD FOR RECOVERING ENERGY FROM AN AIR COMPRESSOR

BACKGROUND

The present invention generally relates to compressors, and more particularly to a method and an apparatus for recovering energy from an air compressor.

Fluid compressors are often used to produce compressed air for use in an industrial setting such as, for example, a manufacturing plant. The compressor typically supplies compressed air to an air supply header that routes air around the plant for use by various equipment. The compressor produces air of a constant pressure, which may be lowered if necessary for specific equipment by conventional regulators or reducers. Due to varying equipment usage the demand for compressed air is typically not a constant value. Regardless of demand, however, the air compressor continues to work to produce a constant pressure in the supply header. Adjustments must be made in compressor output to account for changes in demand. This adjustment is particularly important with centrifugal compressors which often operate at high speeds with continuous air flow for peak efficiency.

Certain systems employ multiple compressors to deal with the changing demand in the air supply header. These systems routinely bring extra compressors on line during periods of increased demand, and secure extra compressors during periods of low demand. This type of system only provides gross control of the compressed air supply and can not be used to accurately match compressed air supply with the demand.

As a result, most compressed air systems operate so that during periods of lower demand a significant amount of compressed air is bypassed or blown off into the atmosphere to maintain the air system supply header pressure constant. The compressed air that is blown off to the atmosphere represents a significant amount of unused product and potential energy that cannot be recovered. Accordingly, there exists a need for a system that converts the potential energy of the excess compressed air into usable energy in order to recovery of some benefit from this excess compressed air and achieve cost savings and improved in compressor efficiency.

Energy recovery systems are known. For example, U.S. Pat. No. 5,689,141 to Kikkawa et al. ("Kikkawa"), incorporated by reference herein, discloses a system of using excess energy from a natural gas turbine to generate electricity for an associated industrial facility. However, Kikkawa merely couples the rotating shaft of the gas turbine to a synchronous motor, and does not teach a system in which the potential energy present in a fluid, such as air, is converted to a useful form of energy.

Similarly, U.S. Pat. No. 4,243,892 to Andersson et al. ("Andersson"), incorporated by reference herein, discloses recovery energy in a pumping system that pumps fluid from a lower level to a higher level. Andersson teaches allowing fluid to flow backwards through the pump in order to operate the pump as a turbine and generate electricity through pump's synchronous motor. Like Kikkawa, Andersson fails to disclose extracting potential energy from a pressurized fluid. Thus, there remains a need for system that converts potential energy present in a pressurized fluid into a useful form of energy. The present invention addresses this need and provides other benefits as well, as described further below.

SUMMARY OF THE INVENTION

A compressed air system is provided. The system includes an air compressor for supplying compressed air to a conduit connected to the discharge of the compressor and configured to receive compressed air for delivery to a compressed air supply header. A power generation system connected to the discharge conduit for converting compressed air into energy is provided. A control valve positioned between the power generation system and the discharge conduit for controlling the air supply to the power generation system may be provided. The control valve is preferably configured to open when the supply of compressed air produced by the air compressor exceeds a demand for compressed air in the compressed air supply header.

The system may further include a bypass valve connected to the discharge conduit for controlling the flow of compressed air to atmosphere. In addition, a check valve may be positioned in the discharge conduit upstream of the bypass valve and downstream of the power generation system to prevent back flow from the supply header to the compressor and power generation system. A microprocessor based controller may be provided to control the position of the control valve. Preferably, the controller operates to open the control valve when pressure in the discharge conduit exceeds a predetermined value.

The power generation system may include an air motor, turbine generator or other suitable devices for converting the compressed air into useful energy. The system may supply provide electric power to supplement an electric motor, or to generate electric power to be supplied to a main power grid. The power generation system may be supplied with heated air that has not been passed through a conventional aftercooler located in the discharge conduit.

According to the present invention, a method for recovering energy from a compressed air system is provided. The method comprises the steps of: compressing air in an air compressor; supplying the compressed air to a conduit for supplying equipment requiring compressed air; measuring the pressure of the compressed air in the conduit; diverting a portion of the compressed air in the conduit to an energy recovery system when the air pressure reaches a first predetermined level; and converting the potential energy of the diverted portion of compressed air to electrical energy.

Preferably, a second portion of the compressed air to atmosphere when air pressure in the conduit reaches a second predetermined level greater than the first predetermined level. The diversion of the second portion of compressed air may be secured when the air pressure in the conduit drops below the second predetermined level. As described further below, the method may include supplying electrical energy to a main electrical grid used to power a prime mover for the compressor or to an oil pump for the compressor. The electrical energy may be produced in a turbine generator.

It is to be understood that both the foregoing general description and the following detailed description are exemplary and explanatory only, and are not restrictive of the invention as claimed.

BRIEF DESCRIPTION OF THE DRAWINGS

These and other features, as aspects, and advantages of the present invention will become apparent from the following description, appended claims, and the accompanying exemplary embodiment shown in the drawings, which are briefly described below:

FIG. 4 is a schematic representation of a fourth embodiment of a compressed air system according to the present invention.

DETAILED DESCRIPTION

Figure 1:
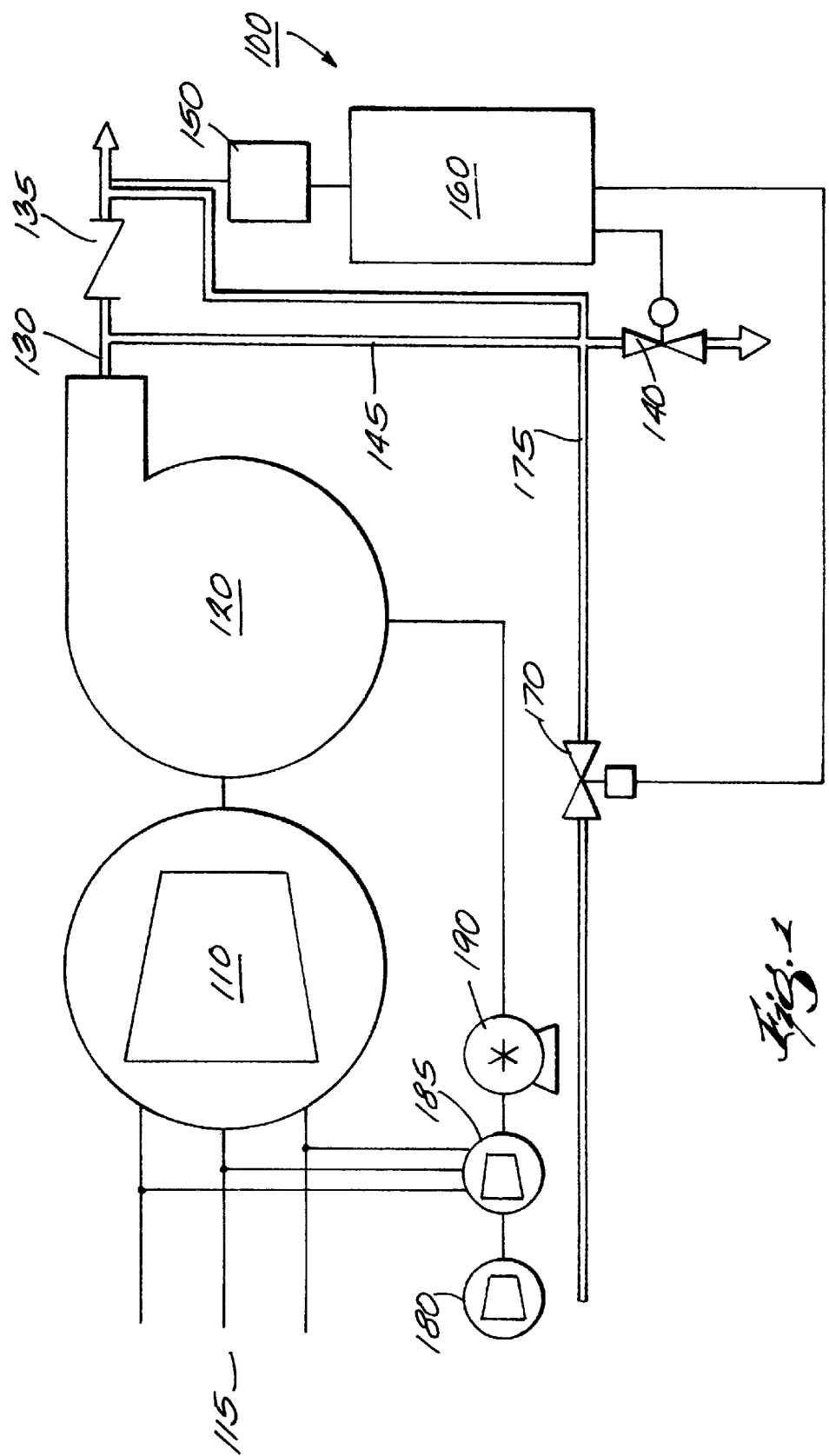
FIG. 1 is a schematic representation of a first embodiment of a compressed air system according to the present invention.

Although references are made below to directions, such as left, right, up, down, etc., in describing the drawing, they are made relative to the drawing (as normally viewed) for convenience. These directions are not intended to be taken literally or limit the present invention in any form.

The apparatus and method of the present invention represent a way to save energy lost in conventional compressors. The present invention is a system for providing compressed air to an air supply system or header for use by equipment, such as, in a factory or manufacturing facility.

The system includes an air compressor that supplies compressed air to a discharge conduit or plant air system. The pressure in the discharge conduit is monitored so that when the pressure exceeds a predetermined value excess compressed air can be routed to an energy recovery system. The energy recovery system converts the potential energy stored in the excess compressed air into electrical or mechanical energy. As described above, under conventional systems this potential energy would be wasted as the excess compressed air would have been blown off to atmosphere.

FIG. 1 is directed to a first embodiment of the present invention. A compressed air system 100 including prime mover or main motor 110 and an air compressor 120 is provided. The prime mover may be any of a number of generally known devices, such as, be an electric motor, a diesel or natural gas engine, a steam engine, or a turbine. As shown in FIG. 1, the main motor 110 is an electric motor powered by a conventional supply of three phase AC electric power. As described above, the present invention is directed to certain unique operating characteristics of centrifugal compressors. However, it is within the scope of the invention for positive displacement compressors to be employed with the system as well. The compressor 120 receives a supply of air at atmospheric pressure and discharges compressed air to a discharge conduit or compressed air supply header 130. The system includes a bypass conduit 145. The flow of compressed air through the bypass conduit 145 is controlled by a bypass valve 140. When the bypass valve 140 is open compressed air is discharge from the discharge conduit 130 to atmosphere through the bypass valve 140.

The system also includes an energy recovery system or power generation system. The energy recovery system includes a recovery conduit or passage 175 for receiving excess compressed air from the discharge header 130. Air flow through the recovery line 175 is controlled by the position of a control valve 170. A device for converting the potential energy of the compressed air into useful energy is located downstream of the control valve.

As shown in FIG. 1, the position of both the control valve 170 and the bypass valve 140 may be controlled by a controller 160. The controller may be a microprocessor type control device. Preferably, both the control valve 170 and the bypass valves 140 are modulating type valves that respond to an electrical signal received from the controller 160. The controller receives an electrical signal corresponding to the pressure in the discharge conduit from a pressure sensor 150. As a result, the position of the valves is adjusted in response to the pressure of the air in the discharge conduit 130.

During operation, when air pressure in the discharge conduit 130 increases above a first predetermined value it is determined that the supply of compressed air exceeds the demand required by the plant or operating equipment being supplied by the system. The controller 160 receives the pressure signal from the sensor 150 and calculates the difference between the actual pressure and the predetermined pressure. When the pressure in the discharge conduit exceeds the predetermined value the controller 160 signals the control valve 170 to open. Similarly, when pressure in the discharge conduit 130 exceeds a second predetermined value the controller 160 signals the bypass valve 140 to open. The controller 160 may operate to throttle the position of one or both of the valves in an intermediate position located somewhere between fully open and fully closed. The microprocessor based controller 160 is configured to operate so that the control valve 170 opens prior to the bypass valve 140.

As shown in FIG. 1, the system may include a check valve 135 located in the discharge conduit 130 between the bypass conduit 145 and the recovery conduit 175. The check valve 135 is positioned to prevent back flow through the discharge conduit from the recovery conduit 175 and plant equipment to the bypass line 145. Therefore, it prevents the rapid depressurization of the discharge piping associated with the manufacturing facility and supplied equipment and energy recovery system.

The energy recovery system supplies high pressure air to certain equipment located downstream of the control valve 170. As shown in FIG. 1, in the first embodiment of the invention, the equipment includes an air motor 180. The air motor 180 is connected to the shaft of an electric motor 185 for an oil pump 190. The oil pump 190 may provide lubricating fluid for the compressor 120, and is normally powered by the electric motor 185. However, when excess compressed air is available through the recovery conduit 175 and control valve 170, the air motor 180 begins to turn and may take over the role of primary driver for the oil pump 190. The air motor 180 may be selected to have a greater horsepower than the electric motor 185. Therefore the air motor 180 may supply power to the oil pump 190 and attempts to drive the electric motor 185 above its synchronous speed, causing the electric motor 185 to operate as a generator and supply power to the electric grid 115. The motor's inherent magnetic properties and physical construction will retard the speed of the air motor 180 to ensure that the air motor 180 produces the proper pump speed.

Figure 2:
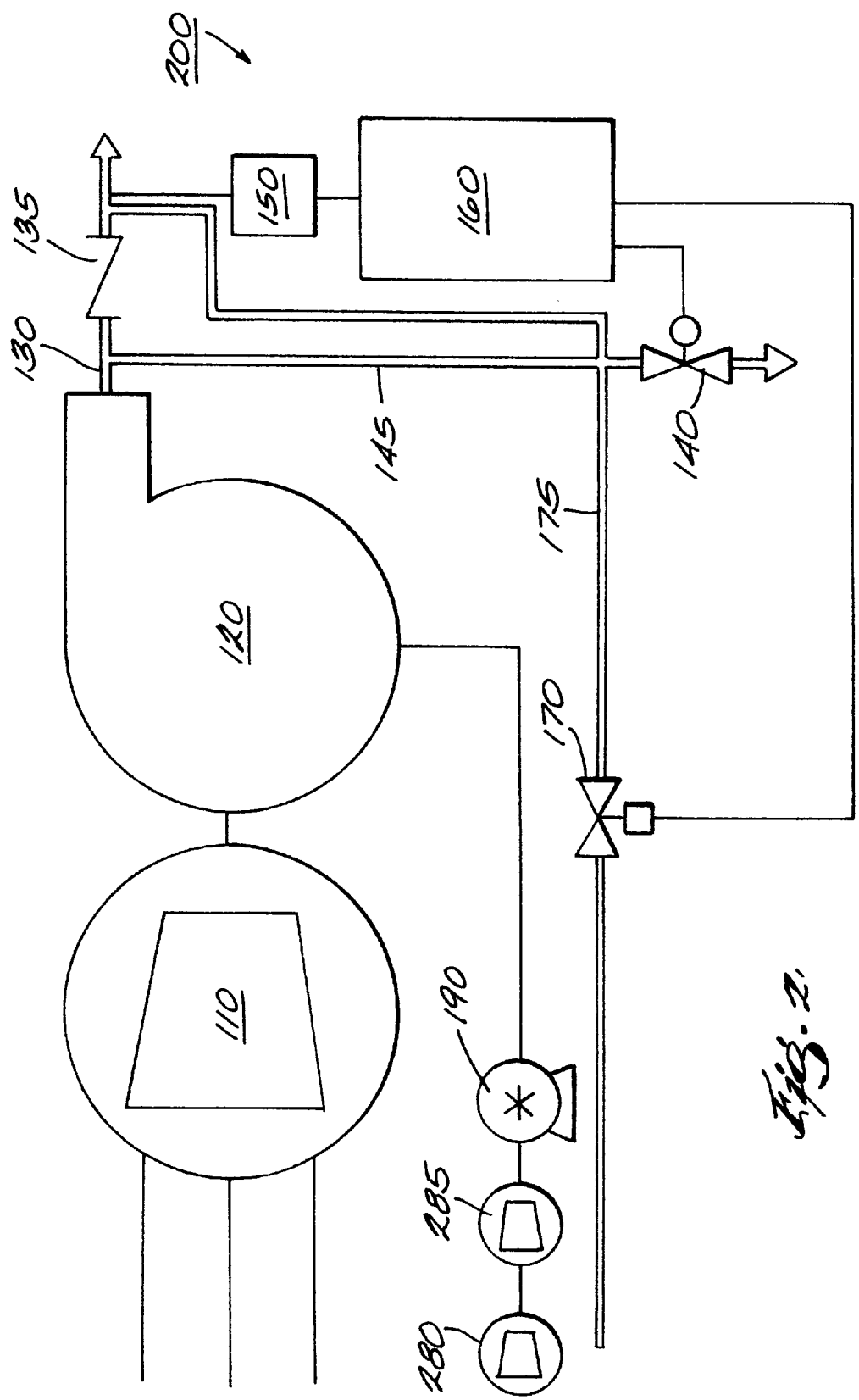
FIG. 2 is a schematic representation of a second embodiment of a compressed air system according to the present invention.

In a second embodiment of the present invention, shown in FIG. 2, the compressed air system 200 includes an energy recovery system with an air motor 280 may be selected to provide supplemental power to electric pump motor 285. In this embodiment, the electric power requirements of the motor 285 are reduced, but supplemental power is not provided to the electric grid 115.

Figure 3:
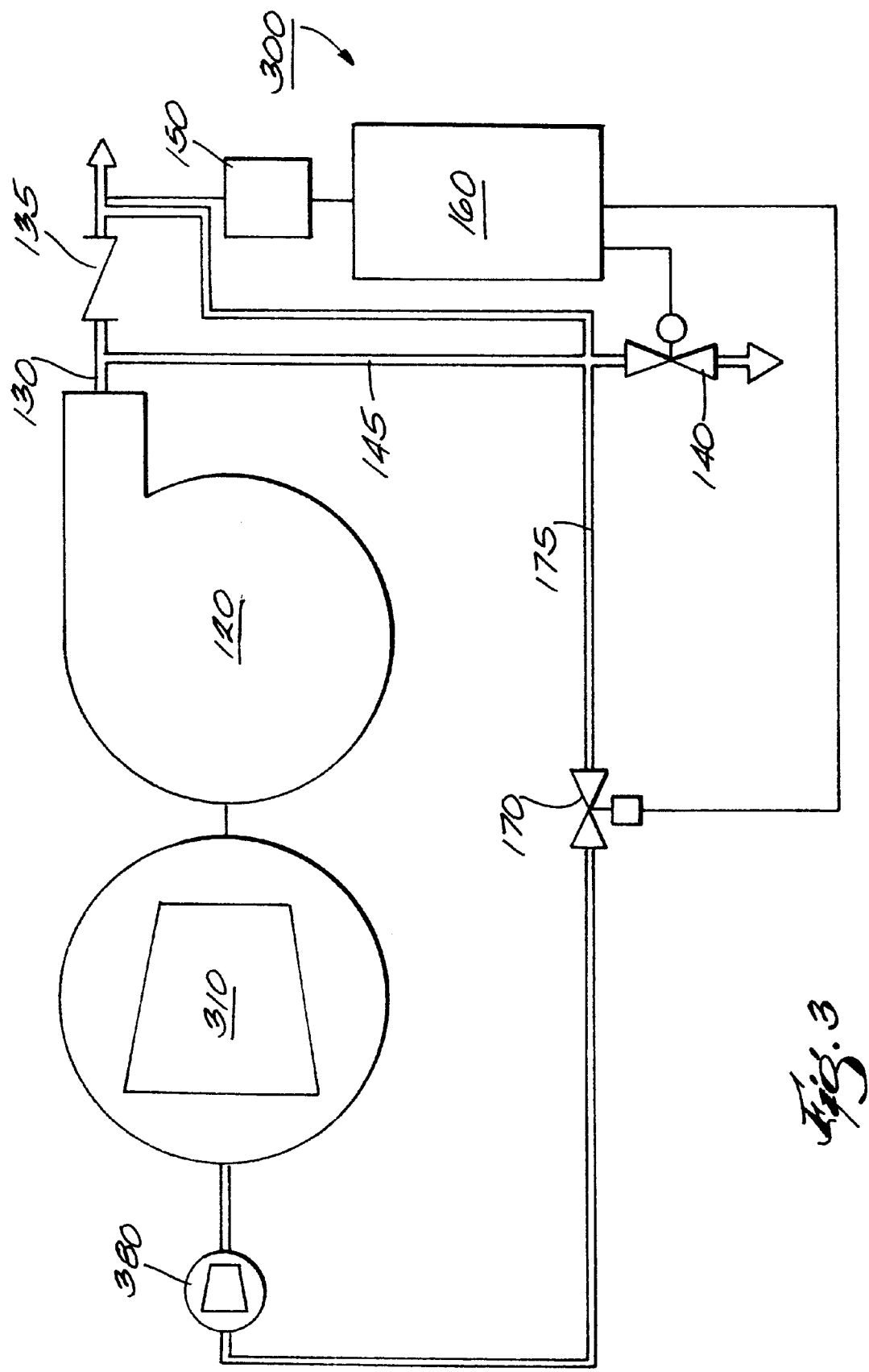
FIG. 3 is a schematic representation of a third embodiment of a compressed air system according to the present invention.

In a third embodiment of the present invention, shown in FIG. 3, the compressed air system 300 includes an energy recovery system having an air motor 380 that converts the potential energy of the excess compressed air into power that supplements a main motor 310 for the compressor 120. The air motor 380 operates at a lower horse power and greater speed than the primary electric motor 310. The air motor 380 attempts to drive the electric motor 310 above synchronous speed thereby adding power to drive the motor. The brake horsepower of the compressor 120 will be decreasing and additional horsepower from the air motor is added causing the overall electric consumption of the system to decrease and energy to be saved.

A fourth embodiment of the present invention is shown in FIG. 4. The compressed air system 400 includes a electric motor 410 for driving a centrifugal compressor 120. The compressor 120 produces hot compressed air that is cooled in an aftercooler or heat exchanger 155 prior to passing through the check valve 135 and being supplied to equipment or facilities requiring compressed air. The system includes a control valve 170 the position of which is controlled by the microprocessor based controller 160. When the controller or master control module 160 determines that excess compressed air exists the control valve 160 opens to supply air to a turbine or turbine like device 480. The turbine speed is monitored by a sensor 470. When turbine speed is determined to be at or above the synchronous speed for the associated generator 490 the master control module 160 operates to close the contacts 485 thereby permitting the generator to power the grid 115.

As shown in FIG. 4, the system does not require the use of a separate bypass system. The system 400 may use only the control valve 170 to bypass excess compressed air away from the discharge conduit 130. The system 400 is designed to bypass hot compressed air upstream of the aftercooler 155 to offer further energy savings. As a result, the present invention, eliminates unnecessary heat removal from the compressed air prior to entry into the turbine chamber. Otherwise, a user's cooling system would be required to expend energy removing the heat from the compressed air.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A compressed air system comprising:
   an air compressor for supplying compressed air;
   a conduit connected to the discharge of the compressor and configured to receive compressed air for delivery to a compressed air supply header;
   a power generation system connected to the discharge conduit for converting compressed air into energy; and
   a control valve positioned between the power generation system and the discharge conduit for controlling the air supply to the power generation system, wherein the control valve is configured to open when the supply of compressed air produced by the air compressor exceeds a demand for compressed air in the compressed air supply header.

2. The system of claim 1, further comprising a bypass valve connected to the discharge conduit for controlling the flow of compressed air to atmosphere.

3. The system of claim 2, further comprising a check valve positioned in the discharge conduit upstream of the bypass valve and downstream of the power generation system, the check valve being configured to prevent back flow from the supply header to the compressor and power generation system.

4. The system of claim 1, further comprising a controller having a microprocessor for controlling the position of the control valve.

5. The system of claim 1, wherein the control valve is adapted to open when air pressure in the conduit exceeds a predetermined value.

6. The system of claim 1, wherein the power generation system includes an air motor.

7. The system of claim 2, wherein the power generation system includes turbine generator.

8. The system of claim 1, wherein the power generation system includes an air motor operatively connected to an electric motor.

9. The system of claim 8, wherein the air motor is configured to drive the electric motor above synchronous speed to provide electrical power to a conventional electrical power supply for the motor.

10. The system of claim 8, wherein the electric motor is operatively connected to an oil pump.

11. The system of claim 1, wherein the power generation system includes a turbine generator.

12. The system of claim 1, further comprising a heat exchanger located in the conduit to reduce the temperature of compressed air produced by the air compressor.

13. The system of claim 12, wherein the power generation system is connected to the discharge conduit upstream of the heat exchanger.

14. A method for recovering energy from a compressed air system comprising the steps of:
   compressing air in an air compressor;
   supplying the compressed air to a conduit for supplying equipment requiring compressed air;
   measuring the pressure of the compressed air in the conduit;
   diverting a portion of the compressed air in the conduit to an energy recovery system when the air pressure reaches a first predetermined level; and
   converting the potential energy of the diverted portion of compressed air to electrical energy.

15. The method of claim 14, further comprising the step of:
   diverting a second portion of the compressed air to atmosphere when air pressure in the conduit reaches a second predetermined level greater than the first predetermined level.

16. The method of claim 15, further comprising the step of securing the step of diverting of the second portion of compressed air when the air pressure in the conduit drops below the second predetermined level.

17. The method of claim 13, wherein the step of converting includes supplying electrical energy to a main electrical grid used to power a prime mover for the compressor.

18. The method of claim 13, wherein the step of converting includes supplying electrical energy to an oil pump for the compressor.

19. The method of claim 13, wherein the electrical energy is produced in a turbine generator.

* * * * *

UNITED STATES PATENT AND TRADEMARK OFFICE
CERTIFICATE OF CORRECTION

PATENT NO.     : 6,360,535 B1
DATED          : March 26, 2002
INVENTOR(S)    : Alvin Joel Fisher It is certified that error appears in the above-identified patent and that said Letters Patent is hereby corrected as shown below:

Column 5,
Line 40, delete "conduit" and insert -- compressed air supply header --.
Line 41, delete "for delivery to a compressed air supply header".
Lines 43, 46, 53 and 56, delete "discharge conduit" and insert -- compressed air supply header --.
Line 53, delete "the" and insert -- a --.
Line 56, delete "upstream" and insert -- downstream --.
Line 57, delete "downstream" and insert -- upstream --.
Line 59, delete "to the compressor".
Line 60, after "generation system", insert -- to the compressor --.

Column 6,
Lines 5, 23, 31, 34, 35, 43 and 48, delete "conduit" and insert -- compressed air supply header --.
Line 9, delete "2" and insert -- 1 --.
Line 26, delete "discharge conduit" and insert -- compressed air supply header --.
Lines 50, 53 and 56, delete "13" and insert -- 14 --.
Line 54, delete "supplying electrical energy to" and insert -- driving --.

Signed and Sealed this

Twenty-fourth Day of December, 2002

JAMES E. ROGAN
*Director of the United States Patent and Trademark Office*